(12) United States Patent
Armstrong et al.

(10) Patent No.: US 6,816,584 B1
(45) Date of Patent: Nov. 9, 2004

(54) ROUTING A CALL THROUGH A TELECOMMUNICATIONS NETWORK

(75) Inventors: Michael G. Armstrong, Philadelphia, PA (US); James E. Haley, Aston, PA (US)

(73) Assignee: Verizon Services Corp., Arlington, VA (US)

( * ) Notice: Subject to any disclaimer, the term of this patent is extended or adjusted under 35 U.S.C. 154(b) by 566 days.

(21) Appl. No.: 09/659,181

(22) Filed: Sep. 11, 2000

(51) Int. Cl.[7] .............................................. H04M 7/00
(52) U.S. Cl. ........................ 379/221.02; 379/221.03; 379/114.02; 379/111; 379/45; 370/389; 370/428
(58) Field of Search .......... 379/220.01, 221.01–221.03, 379/221.08, 45, 14, 114.27, 112.01, 114.02, 111; 370/428, 389

(56) References Cited

U.S. PATENT DOCUMENTS

| | | | | |
|---|---|---|---|---|
| 5,781,620 A | * | 7/1998 | Montgomery et al. . | 379/114.02 |
| 5,838,769 A | * | 11/1998 | McNeil et al. ................ | 379/14 |
| 5,987,110 A | * | 11/1999 | Malik et al. ................. | 379/196 |
| 6,185,282 B1 | * | 2/2001 | Boeckman et al. ........... | 379/45 |
| 6,327,349 B1 | * | 12/2001 | Rollins ................... | 379/114.27 |
| 6,381,315 B1 | * | 4/2002 | Nhaissi ....................... | 379/111 |

OTHER PUBLICATIONS

John Guthmann, "AIN Percent Routing", part of a presentation to DMS100 User's Group on Sep. 21, 1999.
John Guthmann, "Mated 911 Tandems with SS7", part of a presentation to DMS100 User's Group on Sep. 21, 1999.

\* cited by examiner

*Primary Examiner*—Fan Tsang
*Assistant Examiner*—Md Shafiul Alam Elahee
(74) *Attorney, Agent, or Firm*—Leonard C. Suchyta, Esq.; Joel Wall, Esq.; Ohlandt, Grealey, Ruggier & Perie

(57) ABSTRACT

There is provided a method for routing a call through a telecommunications network. The method comprises the steps of receiving a prompt, from one of a plurality of service switching points in a predetermined geographic service area, for a service associated with the call, and determining one of a plurality of tandem switches to which the call will be directed based on a probability distribution. There is also provided a system for routing a call through a telecommunications network.

25 Claims, 3 Drawing Sheets

ROUTING A CALL THROUGH A TELECOMMUNICATIONS NETWORK

BACKGROUND OF THE INVENTION

1. Field of the Invention

The present invention relates to telecommunications networks, and more particularly, to a routing of a call through a telecommunications network based on a probability distribution. The present invention is especially suited for use with enhanced 911 (E911) emergency telephone service.

2. Description of the Prior Art

A conventional public telephone network for a particular geographic service area includes an end office and a plurality of switches known as tandems. The end offices are coupled to each of the tandems via a trunk. When a call originates from a telephone coupled to one of the end offices, the call is routed to one of the tandems, referred to as the primary tandem, and thereafter directed to a destination office. Depending on the nature of the call, the destination office may be in the same geographic service area, or in a different geographic service area.

If all of the trunks from an end office to the primary tandem are in use or maintenance busy, this condition will be recognized by the end office. If an additional call occurs that would ordinarily be routed to the primary tandem, the call will be re-routed to a secondary tandem, and thereafter directed to the destination office. The re-routing is thus triggered by a non-availability of the trunk from the end office to the primary tandem. However, if the trunk from the end office to the primary tandem is available, but the primary tandem experiences a malfunction that prevents a completion of the call, then the re-routing of the call to the secondary tandem will not be triggered. Consequently, a caller could repeatedly attempt to place a call, but the call would be blocked at the malfunctioning primary tandem.

After service personnel recognize a malfunction of the primary tandem, they can alter the operation of the end office so that no calls are routed from the end office to the faulty primary tandem. Instead the calls will be routed to the secondary tandem.

In practice, most public telephone networks include a plurality of end offices, each of which is coupled to a plurality of tandems. Consequently, when a malfunction of a tandem requires a change at an end office, the change must be made at each of the end offices that are coupled to the tandem.

An incompletion of a call is always objectionable. However, it is particularly serious in a case where the call is for an emergency service, such as in the case of an enhanced 911 (E911) call. E911 telephone service allows a person to call for emergency assistance by dialing 911 from a telephone. The E911 call is routed to an E911 Public Safety Answering Point (PSAP) typically located in a firehouse, police department or other designated location that services the area from which the call originated. The incompletion of an E911 call can delay the response to the emergency. The consequence of such a delay could be very serious or grave.

SUMMARY OF THE INVENTION

It is an object of the present invention to provide an improved method for routing a call through a telecommunications network.

It is another object of the present invention to provide such a method in which a call from a particular geographic service region is randomly routed to one of a plurality of tandem switches.

It is another object of the present invention to provide such a method that conveniently prohibits a routing of calls to a malfunctioning tandem switch.

It is a further object of the present invention to provide such a method in which a distribution of calls routed through a plurality of end offices to a plurality of tandem switches can be redefined at a central location rather than at each end office.

These and other objects of the present invention are achieved by a method for routing a call through a telecommunications network, comprising the steps of (a) receiving a prompt, from one of a plurality of service switching points in a predetermined geographic service area, for a service associated with the call, and (b) determining one of a plurality of tandem switches to which the call will be directed based on a probability distribution.

DESCRIPTION OF THE INVENTION

The present invention provides a method and system for routing a call through a telecommunications network. An embodiment of the system includes a processor (a) for receiving a prompt, from one of a plurality of service switching points in a predetermined geographic service area, for a service associated with the call, and (b) for determining one of a plurality of tandem switches to which the call will be directed based on a probability distribution.

Throughout the telecommunications industry, telecommunications networks are being upgraded to operate in accordance with signaling system #7 (SS7) standards. SS7 signaling permits a use of advanced intelligent network (AIN) features that access an external database to provide control of switching for calls originating from a telephone that is coupled to an AIN-enabled end office.

AIN allows control of a call via remote software to enable a customized service for the call. E911 is one such service. The present invention is described below in the context of an E911 call, however the present invention is not limited to E911 service, but instead, it can be applied to any service associated with the call.

Figure 1:
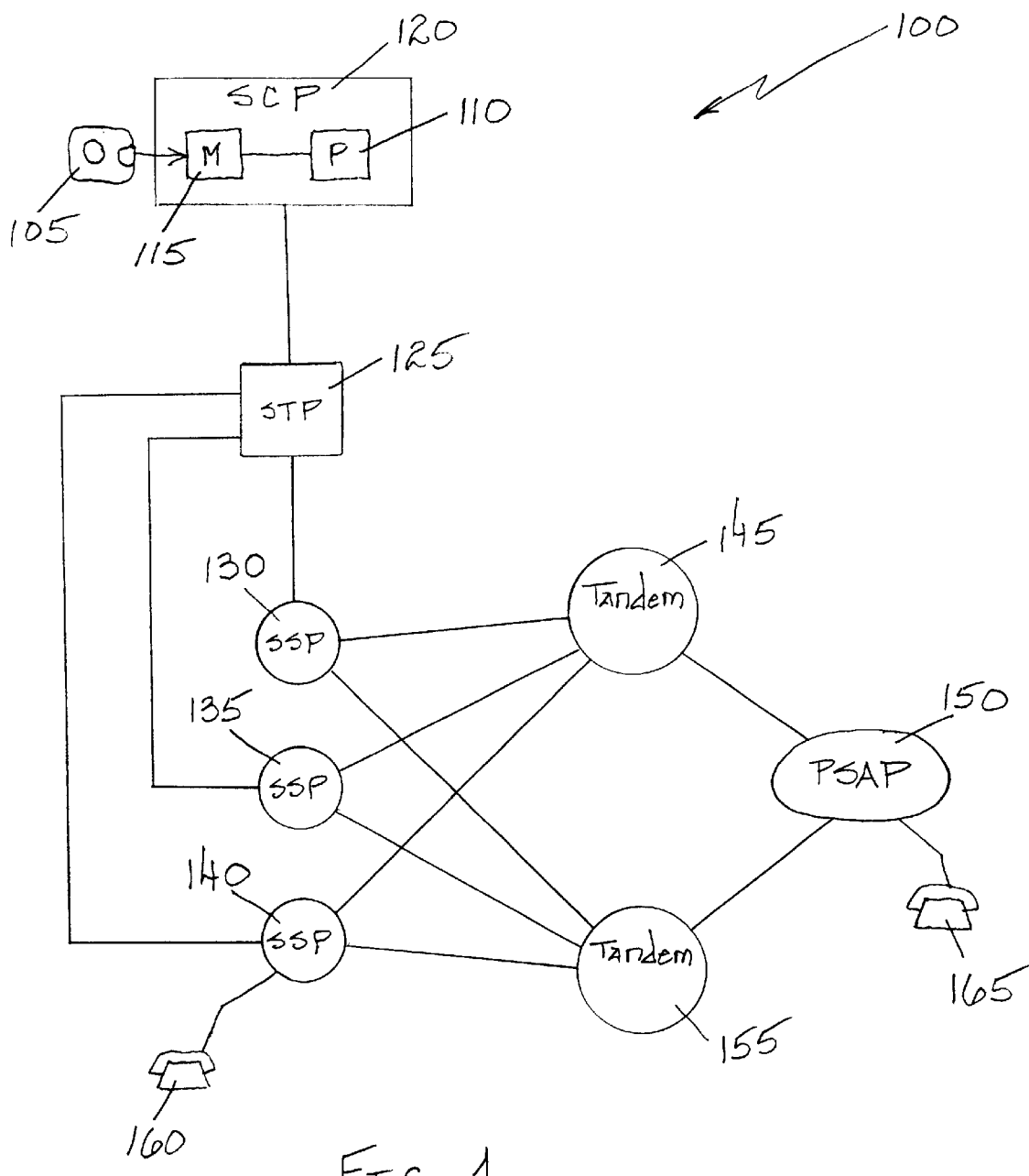
FIG. 1 is a block diagram of a telecommunications network particularly suited for routing of a call in accordance with the present invention.

FIG. 1 is a block diagram of a telecommunications network 100. The network includes several end offices, namely service switching points (SSP's) 130, 135 and 140, a signal transfer point (STP) 125, a service control point (SCP) 120, two tandems 145 and 155, and a public service answering point (PSAP) 150. A telephone 160 and an E911 switchboard 165 are also included.

Each of SSP's 130, 135 and 140 is connected to STP 125 via SS7 signaling links called "A Links", which carry SS7 signaling messages from SSP's 130, 135 and 140 to STP 125. STP 125 is connected to, and routes the SS7 messages to, SCP 120. SCP 120 sends AIN call control instructions back through STP 125, and thereafter to SSP's 130, 135 and 140 via the A Links. The A links are diversified to increase network reliability.

Each of SSP's 130, 135 and 140 is also coupled, via a trunk group consisting of two or more members, to each of tandem 145 and tandem 155. That is, SSP 130 is coupled to tandem 145 via a first trunk group and to tandem 155 via a second trunk group; SSP 135 is coupled to tandem 145 via a third trunk group and to tandem 155 via a fourth trunk group; and SSP 140 is coupled to tandem 145 via a fifth trunk group and to tandem 155 via a sixth trunk group. Each of tandems 145 and 155 are, in turn, coupled to PSAP 150.

SSP's 130, 135 and 140 are each an end office with AIN capability. When one of the SSP's detects a call requiring AIN call service processing, it sends a query relating to the service to STP 125.

STP 125 is a signaling hub that redirects signals between elements of network 100, and thus manages the signaling and transport of signaling in network 100. When it receives a query from one of STP's 130, 135 or 140, it routes the query to SCP 120.

SCP 120 has hardware and software that contains database information and service logic for providing AIN services. When it receives a query from STP 125, it searches a database, determines a route for the call and returns a routing instruction to STP 125, which in turn, sends the routing instruction to the SSP that generated the query.

SCP 120 has a processor 110 with an associated memory 115. Memory 115 contains instructions and data for controlling processor 110 to control the flow of AIN query/response messages, and to determine a route for a call through network 100. More particularly, the instructions control processor 110 (a) to receive a prompt, e.g., a query, from one of SSP's 130, 135 and 140, for a service associated with the call, in this example, E911 service, (b) to determine one of tandems 145 and 155 to which the call will be directed based on a probability distribution, and (c) to send a response to the SSP from which it received the prompt, including call processing instructions directing the SSP to route the call to the determined tandem.

Although system 100 is described herein as having instructions installed into memory 115, the instructions can reside on an external storage media 105 for subsequent loading into memory 115. Storage media 105 can be any conventional storage media, including, but not limited to, a floppy disk, a compact disk, a magnetic tape, a read only memory, or an optical storage media. Storage media 105 could also be a random access memory, or other type of electronic storage, located on a remote storage system and coupled to memory 115.

Tandems 145 and 155 have switches for routing calls from SSP's 130, 135 and 140 to PSAP 150. In practice, tandems 145 and 155 may also be SSP's, and PSAP 150 may be one of a plurality of PSAP's to which tandems 145, 155 may direct a call.

PSAP 150 is an end office that serves a telephone, or other appropriate device, to which a call is directed. In this example, PSAP 150 is the end office for E911 switchboard 165.

E911 switchboard 165 is located in a firehouse, police department or other appropriate location that services the geographic service area in which SSP's 130, 135 and 140, and tandems 145 and 155, are located.

Figure 2:
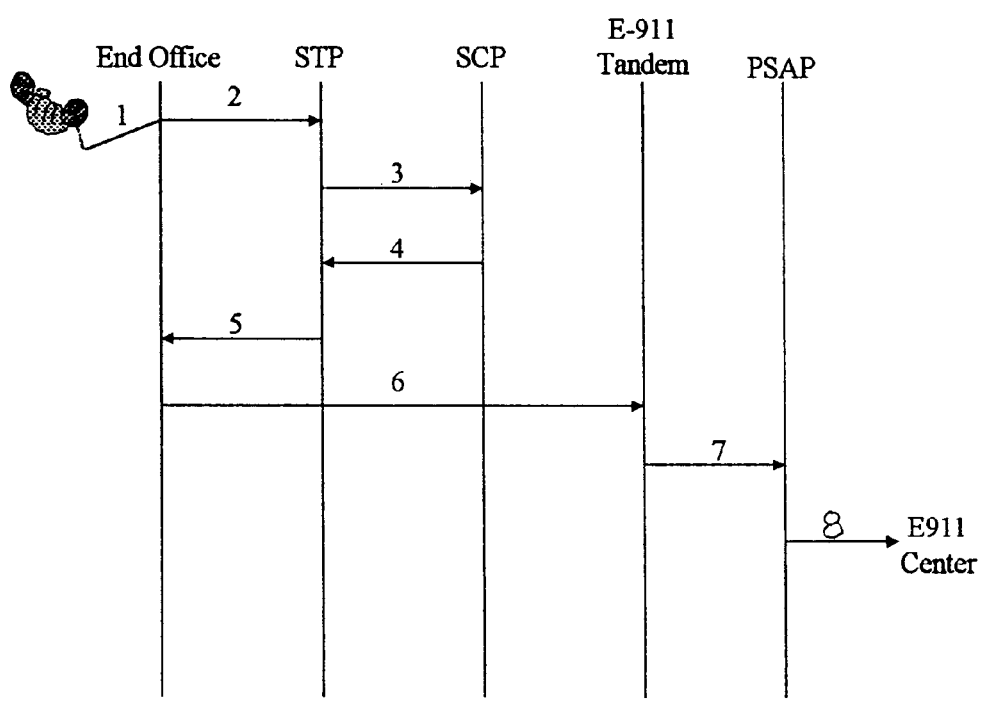
FIG. 2 is a call flow diagram showing a routing of an E911 call.

FIG. 2 is a call flow diagram showing a routing of an E911 call. While referring concurrently to FIGS. 1 and 2, the following example illustrates how an E911 call from telephone 160 is routed to E911 switchboard 165.

An E911 telephone call originating from telephone 160 is first connected to SSP 140 (FIG. 2, line 1). From SSP 140, a query is sent to STP 125 (FIG. 2, line 2). STP 125 routes the query to SCP 120 (FIG. 2, line 3).

In SCP 120, the service logic associated with E911 is activated. SCP 120 determines the geographic service area for the E911 call, and assigns a random number value to the call. The routing for the call is based on where the number falls within a probability distribution. SCP 120 determines the trunk and tandem through which the call will be routed. For this example, assume that tandem 155 is selected. SCP 120 then sends a routing instruction to STP 125 (FIG. 2, line 4).

STP 125 passes the routing instruction back to the originating SSP, in this case SSP 140 (FIG. 2, line 5). SSP 140 receives the routing instruction, and complies by routing the call to the appropriate tandem, in this case tandem 155 (FIG. 2, line 6). Tandem 155 processes the E911 call, and routes the call to PSAP 150 (FIG. 2, line 7). PSAP 150 routes the call to E911 switchboard 165 (FIG. 2, line 8).

SSP's that provide E911 service are represented in a group in SCP 120 based on a predetermined geographic service area. Service logic in SCP 120 routes one or more calls to an appropriate tandem 145, 155 based on a probability distribution. For the present example, assume that a default probability distribution of 50/50 routes 50% of the E911 calls to tandem 145 and 50% of the E911 calls to tandem 155.

SCP 120, through the operation of processor 110, assigns a random number between 1–100 to each E911 call that it encounters from a particular service area. The call is routed based on this random value. For example, assume 50% routing such that tandem 145 handles calls assigned random numbers from 1 to 50, and tandem 155 handles calls assigned random numbers from 51 to 100. If a first call is assigned random number 24, then the call will be routed to tandem 145 because $1 \leq 24 \leq 50$. If the next call is assigned random number 83, then it will be routed to tandem 155 because $51 \leq 83 \leq 100$. Over a large number of calls, this technique provides a 50/50 distribution of calls between tandem 145 and tandem 155.

SCP 120 can also process requests for E911 service from other geographic service areas beyond that represented in FIG. 1. Accordingly, an appropriate routing distribution is defined for each of the other service areas.

Each SSP 130, 135, 140 is identified in SCP 120 by a signaling point code value from which SCP 120 can determine the name of an E911 service area. Each SSP in a given service area has an assigned route index value for tandem 145 and tandem 155.

After SCP 120 determines the tandem to which the call will be routed, SCP 120 formulates a response message that includes a routing instruction, and sends the message to the originating SSP. The message also includes the route index of a primary tandem as a first route. In a case where all trunk lines in the first route are busy, the SSP will route the call to an alternate tandem.

The present invention provides the ability for service personnel to override the default 50% routing probability distribution. This override can be exercised for a cluster of SSP's that service a particular E911 tandem pair. The manual override is part of a disaster recovery plan for each E911 service area. For example, in a situation where one of two available tandems malfunctions, the service personnel can change the service group from a 50/50 distribution to a 100/0 distribution so that all E911 traffic that originated from that particular service group will be routed to the operational tandem.

In the context of an E911 call, if two tandems are available for E911 calls in a geographic service area, and if one of the tandems fail, not only would 50% of the E911 calls still be completed via a routing to the good tandem, but also re-dials of failed attempts would have a good chance of being completed via the good tandem. Further, once this problem situation is realized, a single change in the percentage designation within the AIN system, for example to 100/0, would bypass the failed tandem and thus remedy the problem.

Note that in system 100 this override is performed at SCP 120 by changing the probability distribution for the routing of calls to tandems 145 and 155. This single change at SCP 120 affects the routing of all E911 calls from SSP's 130, 135 and 140, so that no change is required at the individual SSP's. This is particularly advantageous as compared to the prior art disaster recovery techniques that required a change at each SSP to redirect calls to an alternate, operational tandem.

Figure 3:
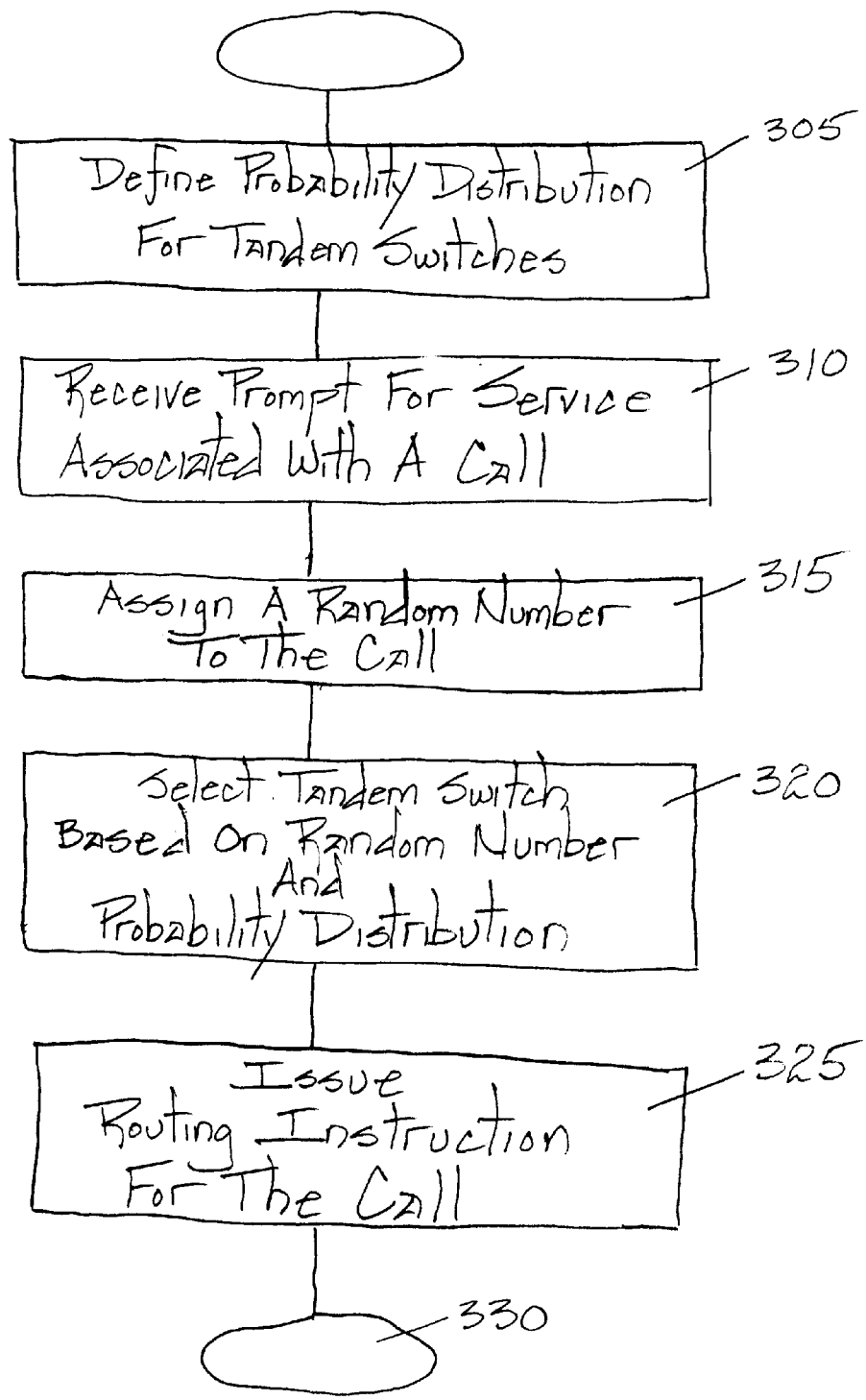
FIG. 3 is a flowchart of a method for routing a call through a telecommunications network in accordance with the present invention.

FIG. 3 is a flowchart of a method for routing a call through a telecommunications network in accordance with the present invention. The method includes the steps of (a) receiving a prompt, from one of a plurality of service switching points in a predetermined geographic service area, for a service associated with the call, and (b) determining one of a plurality of tandem switches to which the call will be directed based on a probability distribution. In the context of system 100, processor 110 executes this method as controlled by instructions stored in memory 115. The method begins with the execution of step 305.

In step 305, the probability distribution is defined for the routing of calls to the tandems in the network. In system 100, the probability distribution is stored in memory 115 for use by processor 110.

The probability distribution is based on the number of operational tandems in the service area. In a case where the service area contains two tandems, i.e., a first tandem 145 and a second tandem 155, such as in FIG. 1, a default routing of 50% is directed to each tandem. That is, approximately 50% of the calls from the service area are routed to the first tandem 145 and the remaining 50% of the calls are routed to the second tandem 155. Note that the routing functionality is defined for an E911 service area, rather than for the individual SSP's 130, 135, 140. This means that from a specific SSP 130, 135, 140, the routing distribution to each of tandems 145 and 155 might not be 50/50. However, on average, calls from the entire E911 service area will be distributed 50/50 between the two tandems 145 and 155.

The probability distribution for the routing may be regarded as a percentage distribution. That is, the routing between tandems 145 and 155 is based on a percentage of calls, e.g., 50% to tandem 145 and 50% to tandem 155. Because a geographic service area may cover many end offices, it is possible that several calls from a given end office may be routed to the same tandem. For example, assume a first call from SSP 130 is routed to tandem 145. If a first call from SSP 140 occurs before a second call from SSP 130, then the second call from SSP 130 may also be routed to tandem 145. However, over an extended period of time, calls will be routed to each of tandems 145 and 155 in accordance with a 50% distribution.

The routing distribution need not necessarily be defined to provide a 50/50 distribution. Any desired probability distribution may be employed. Also, in a case where the service area contains more than two tandems, the distribution can allocate some percentage of calls to each of the available tandems. Preferably, a similar percentage of calls associated with the service is allocated to each of the tandems in the geographic service area. Accordingly, the probability distribution balances the routing determination such that each tandem switch receives a similar average number of calls associated with the service. Alternatively, the distribution could be based on a mathematical function that relates to a number of trunks or a number of calls.

After completion of step 305, the method advances to step 310.

In step 310, a prompt is received for a service associated with the call. In system 100, the prompt is derived from a query that originated at one of the SSP's 130, 135, 140, and the prompt is received by processor 110. The method then advances to step 315.

In step 315, a random number is assigned to the call. In system 100, processor 110 assigns a random number to the call. The method then advances to step 320.

In step 320, a tandem switch is selected based on the random number and the probability distribution. In system 100, processor 110 determines a route for the call. The method then advances to step 325.

In step 325, a routing instruction for the call is issued. In system 100, processor 110 issues the routing instruction, which is included in a message from SCP 120 to one of SSP's 130, 135, 140. The method then advances to step 330.

In step 330, the method terminates.

It should be understood that various alternatives and modifications could be devised by those skilled in the art. For example, the present invention can also be employed to route calls for critical telephony customers, such as the Federal Aviation Administration, or law enforcement agencies. The present invention is intended to embrace all such alternatives, modifications and variances that fall within the scope of the appended claims.

What is claimed is:

1. A method for routing a call through a telecommunications network, comprising the steps of:

receiving a prompt, from one of a plurality of service switching points in a predetermined geographic service area, for a service associated with said call;

assigning a random number to said call, in response to receipt of said prompt; and determining one of a plurality of tandem switches to which said call will be directed based on where said random number falls within a probability distribution.

2. The method of claim 1, further comprising determining a route for said call.

3. The method of claim 1, further comprising issuing a routing instruction for said call.

4. The method of claim 1, further comprising defining said probability distribution to allocate calls related to said service among said plurality of tandem switches.

5. The method of claim 4, wherein said defining step allocates to each of said plurality of tandem switches a similar percentage of calls associated with said service.

6. The method of claim 4, wherein said defining step excludes at least one of said plurality of tandem switches from said allocation.

7. The method of claim 1, wherein said probability distribution balances said determination such that each of said plurality of tandem switches receives a similar average number of calls associated with said service.

8. The method of claim 1, wherein said service is an emergency telephone service.

9. A processor for routing a call through a telecommunications network, comprising:

means for receiving a prompt, from one of a plurality of service switching points in a predetermined geographic service area, for a service associated with said call;

means for assigning a random number to said call, in response to receipt of said prompt; and means for determining one of a plurality of tandem switches to which said call will be directed based on where said number falls within a probability distribution.

10. The processor of claim 9, further comprising means for determining a route for said call.

11. The processor of claim 9, further comprising means for issuing a routing instruction for said call.

12. The processor of claim 9, further comprising means for defining said probability distribution to allocate calls related to said service among said plurality of tandem switches.

13. The processor of claim 12, wherein said defining means allocates to each of said plurality of tandem switches a similar percentage of calls associated with said service.

14. The processor of claim 12, wherein said defining means excludes at least one of said plurality of tandem switches from said allocation.

15. The processor of claim 9, wherein said probability distribution balances said determination such that each of said plurality of tandem switches receives a similar average number of calls associated with said service.

16. The processor of claim 9, wherein said service is an emergency telephone service.

17. A storage media including instructions for controlling a processor that, in turn, routes a call through a telecommunications network, said storage media comprising:

instructions for controlling said processor to receive a prompt, from one of a plurality of service switching points in a predetermined geographic service area, for a service associated with said call;

instructions for controlling said processor to assign a random number to said call, in response to receipt of said prompt; and instructions for controlling said processor to determine one of a plurality of tandem switches to which said call will be directed based on where said number falls within a probability distribution.

18. The storage media of claim 17, further comprising instructions for controlling said processor to determine a route for said call.

19. The storage media of claim 17, further comprising instructions for controlling said processor to issue a routing instruction for said call.

20. The storage media of claim 17, further comprising instructions for controlling said processor to define said probability distribution to allocate calls related to said service among said plurality of tandem switches.

21. The storage media of claim 20, further comprising instructions for controlling said processor to define said probability distribution to allocate to each of said plurality of tandem switches a similar percentage of calls associated with said service.

22. The storage media of claim 20, further comprising instructions for controlling said processor to exclude at least one of said plurality of tandem switches from said allocation.

23. The storage media of claim 17, wherein said probability distribution balances said determination such that each of said plurality of tandem switches receives a similar average number of calls associated with said service.

24. The storage media of claim 17, wherein said service is an emergency telephone service.

25. A method for routing a call through a telecommunications network, comprising the steps of:

receiving a prompt for a service associated with said call;

assigning a random number to said call, in response to receipt of said prompt; and determining one of a plurality of tandem switches to which said call will be directed based on where said random number falls within a probability distribution.

* * * * *